(12) United States Patent
Tanimoto et al.

(10) Patent No.: US 6,729,183 B2
(45) Date of Patent: May 4, 2004

(54) THERMOSENSITIVE FLOW RATE DETECTING DEVICE

(75) Inventors: Koji Tanimoto, Tokyo (JP); Shinji Taniguchi, Tokyo (JP); Ryuji Toyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/987,671

(22) Filed: Nov. 15, 2001

(65) Prior Publication Data

US 2002/0178807 A1 Dec. 5, 2002

(30) Foreign Application Priority Data

Jun. 5, 2001 (JP) ........................................ 2001-169447

(51) Int. Cl.$^7$ ................................................. G01F 1/68
(52) U.S. Cl. .................................................. 73/204.26
(58) Field of Search ........................ 73/204.16, 204.17, 73/204.18, 204.19, 204.25, 204.24, 204.27, 118.2, 204.15, 204.22, 204.26

(56) References Cited

U.S. PATENT DOCUMENTS

| | | | | |
|---|---|---|---|---|
| 4,843,881 A | * | 7/1989 | Hubbard | 73/204.16 |
| 5,069,066 A | * | 12/1991 | Djorup | 73/204.15 |
| 5,237,867 A | * | 8/1993 | Cook, Jr. | 73/204.15 |
| 5,369,994 A | * | 12/1994 | Hecht et al. | 73/204.16 |
| 5,423,210 A | * | 6/1995 | Uchiyama | 73/204.15 |
| 5,753,815 A | * | 5/1998 | Murata | 73/204.15 |
| 6,125,695 A | * | 10/2000 | Alvesteffer et al. | 73/204.27 |
| 6,205,854 B1 | * | 3/2001 | Tohyama et al. | 73/204.15 |

FOREIGN PATENT DOCUMENTS

JP 11-351936 12/1999 ............ G01F/1/68

* cited by examiner

Primary Examiner—Edward Lefkowitz
Assistant Examiner—Jewel Thompson
(74) Attorney, Agent, or Firm—Sughrue Mion, PLLC

(57) ABSTRACT

To provide a thermosensitive flow rate detecting in which no response lag occurs even if the flow rate change frequency is high, and no error in detection flow rate is produced even if the power source change would occur, a thermosensitive flow rate detecting device is provided which includes: a heat generating resistor provided in fluid to be measured for generating heat by electric power consumed in accordance with a flow rate of the fluid to be measured; a first temperature detecting resistor for detecting a temperature of the fluid to be measured which changes according to the flow rate; and a second temperature detecting resistor for detecting the temperature of said heat generating resistor, further including a bridge circuit provided with the first temperature detecting resistor and the second temperature detecting resistor, the heating current of the heat generating resistor being controlled such that a temperature difference between the first temperature detecting resistor and the second temperature detecting resistor is kept constant, and the flow rate within the fluid to be measured being detected by using the heating current, wherein a voltage in proportion to the heating current of the heat generating resistor is applied to the bridge circuit.

4 Claims, 2 Drawing Sheets

THERMOSENSITIVE FLOW RATE DETECTING DEVICE

BACKGROUND OF THE INVENTION

1. Field of the Invention

The present invention relates to a thermosensitive flow rate detecting device, and more particularly to a thermosensitive flow rate detecting device used for detecting a flow rate of intake air in, for example, an automotive engine and particularly for enhancing the detection precision for an engine pulsating flow.

2. Description of the Related Art

In general, a thermosensitive flow rate detecting device is used for metering a flow rate of air sucked to an automotive engine with a detecting circuit structure as shown in FIG. 4. FIG. 4 is a circuit diagram showing a structure of a conventional thermosensitive flow rate detecting device as disclosed in Japanese Patent Application Laid-Open No. Hei 11-351936. The structure shown in FIG. 4 will now be described.

In FIG. 4, the circuit includes a first temperature detecting resistor 3 for detecting a temperature of intake air, a heat generating resistor 4, a second temperature detecting resistor 5 disposed in the vicinity of the heat generating resistor 4 for detecting a temperature of generated heat, a power source 8, a fixed resistor 9, transistors 12a and 12b, a constant voltage power source 13 for applying a constant voltage to a bridge circuit, a flow rate detecting terminal 14, and a differential amplifier 16a. Numeral 15 denotes a flow rate output signal.

It should be noted here that the bridge circuit is formed by the first temperature detecting resistor 3 for detecting the temperature of the intake air, the second temperature detecting resistor 5 disposed in the vicinity of the heat generating resistor 4 for detecting a temperature of generated heat, and the fixed resistor 9. A constant voltage is supplied to the bridge circuit from the constant voltage source 13. An output terminal of the bridge circuit is connected to an input terminal of the differential amplifier 16a. An output of the differential amplifier 16a is connected to the heat generating resistor 4 through the transistors 12a and 12b.

Each circuit constant of the bridge circuit is set such that the second temperature detecting resistor 5 is balanced under the condition that it is a constant temperature higher than the first temperature detecting resistor 3. Accordingly, a heating current is fed to the heat generating resistor 4 so that the input voltage difference of the above-described differential amplifier 16a becomes substantially zero. Therefore, a constant temperature difference circuit is formed in which the second temperature detecting resistor 5 and the heat generating resistor 4 are kept at a temperature that is a constant temperature higher than the temperature of the intake air.

As described above, the constant temperature difference circuit has a characteristic to follow a change in flow rate with high responsiveness because the feedback circuit is formed. For instance, in the case where the flow rate is increased, the second temperature detecting resistor 5 and the heat generating resistor 4 are cooled down, and when the resistance value is somewhat decreased, the voltage of a non-inverting input terminal of the differential amplifier 16a is increased. As a result, the output voltage of the differential amplifier is increased, and thus the emitter current of the transistors 12a and 12b is also increased. Furthermore, the heating current of the heat generating resistor 4 is increased to elevate the temperature of the heat generating resistor.

The temperature change of this heat generating resistor 4 is transferred to the second temperature detecting resistor 5 through heat conduction. Also, the temperature (resistance) of the second temperature detecting resistor 5 is elevated to the original temperature (resistance) to balance the bridge circuit.

Incidentally, during the period until the temperature of the second temperature detecting resistor 5 is returned back to the original one after the heating current of the heat generating resistor 4 is increased, there is only a heat conduction phenomenon from the heat generating resistor 4 to the second temperature detecting resistor 5, and any electrical effect does not work between the heat generating resistor 4 and the second temperature detecting resistor 5. Accordingly, when the flow rate change frequency is high, the response lag from the time the second temperature detecting resistor 5 is cooled down by the flow to decrease its temperature to the time the temperature is returned back to the original one by heating the heat generating resistor 4 becomes a problem. Also, since the alternating current property of the constant temperature difference circuit depends upon the current amplification rate of the transistors 12a and 12b, there is a problem that when the current amplification rate is changed, the responsiveness is changed.

As described above, in the prior art, there is a problem of response lag when the flow rate change frequency is high. In general, in case of the intake air of the engine, the higher the engine rpm, the higher the flow rate becomes. Accordingly, even if good response property with excellent followability is observed in the low flow rate and low rpm region, the response lag is observed for the engine pulsating flow in the high flow rate and high rpm region. As a result, there is a problem of the detection flow rate error. Also, the frequency response property is dependent upon the temperature, and in addition, the higher the temperature, the higher the current amplification rate of the transistors becomes. Thus, in the high temperature range, the responsiveness is high and more resonant, whereas in the low temperature range, the responsiveness is attenuated, and depending upon the situation, there is the response lag resulting in a detection error as described above.

Also, in the case of the power source change, the power source change tends to appear to be imposed with the output signal through the heating current feeding transistor 12a. When the power source change becomes remarkable, there is a problem that the detection flow rate error would occur.

SUMMARY OF THE INVENTION

In order to overcome the above-described problems, an object of the present invention is to provide a thermosensitive flow rate detecting device in which no response lag is caused even if the flow rate change frequency is high, and no error in detection flow rate occurs even if the power source change would occur.

In order to attain this and other objects, according to the present invention, there is provided a thermosensitive flow rate detecting device comprising: a heat generating resistor provided in a fluid to be measured for generating heat by electric power consumed in accordance with a flow rate of the fluid to be measured; a first temperature detecting resistor for detecting a temperature of the fluid to be measured which changes in accordance with the flow rate; and a second temperature detecting resistor for detecting the temperature of the heat generating resistor, further comprising a bridge circuit provided with the first temperature detecting resistor and the second temperature detecting resistor, for controlling heating current of the heat generating resistor so that a temperature difference between the first temperature detecting resistor and the second temperature detecting resistor is kept constant, and for detecting the flow rate within the fluid to be measured by using the heating current, wherein a voltage in proportion to the heating current of the heat generating resistor is applied to the bridge circuit.

DESCRIPTION OF THE PREFERRED EMBODIMENTS

Embodiment 1

Figure 1:
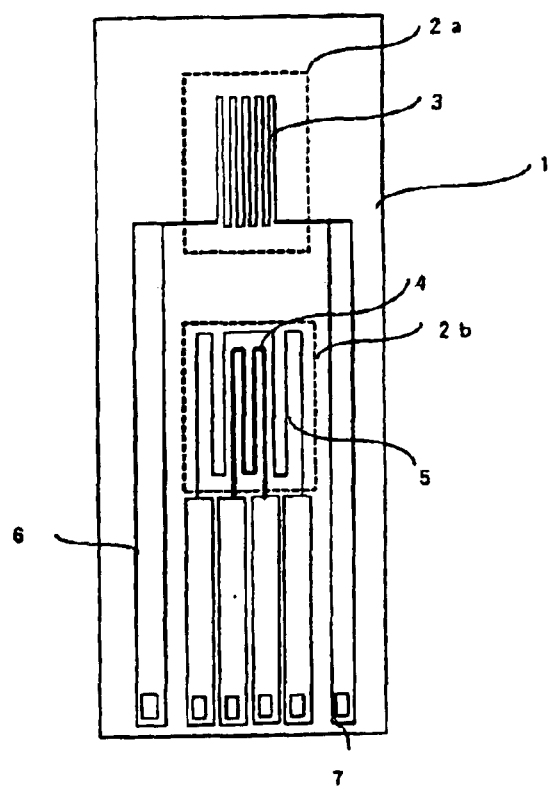
FIG. 1 is a plan view of a flow rate detecting element in a thermosensitive flow rate detecting device in accordance with a first embodiment of the present invention.

FIG. 1 is a plan view of a flow rate detecting element in a thermosensitive flow rate detecting device in accordance with an embodiment 1 of the present invention.

In FIG. 1, reference numeral 1 denotes the flow rate detecting element, reference symbols 2a and 2b denote diaphragms, numeral 3 denotes a first temperature detecting resistor, numeral 4 denotes a heat generating resistor, numeral 5 denotes a second temperature detecting resistor and numeral 6 denotes a wiring.

As shown in FIG. 1, the heat generating resistor 4, the first temperature detecting resistor 3 for detecting the temperature of intake air and the second temperature detecting resistor 5 for detecting the temperature of the generated heat are formed on an insulating film on a top surface side of a silicon substrate.

In order to decrease a heat capacitance of the heat generating resistor 4, a part of the silicon substrate which is on the back side of the portion in which the heat generating resistor 4 and the second detecting resistor 5 are formed is removed by etching to thereby form a diaphragm 2b having a thickness of several micrometers.

It should be noted here that resistance values of the heat generating resistor 4, the first temperature detecting resistor 3 and the second temperature detecting resistor 5 change depending upon the temperature. For example, a film having a thickness of about 0.2 micrometers and made of, for example, platinum thin film is formed on a silicon substrate having on its surface an insulating film formed by evaporation and spattering, and is then subjected to patterning. After a protection film made of insulating film is formed by spattering after patterning, the protection film for an electrode portion 7 is removed and opened so that it may be electrically connected to the above-described platinum thin film.

Figure 2:
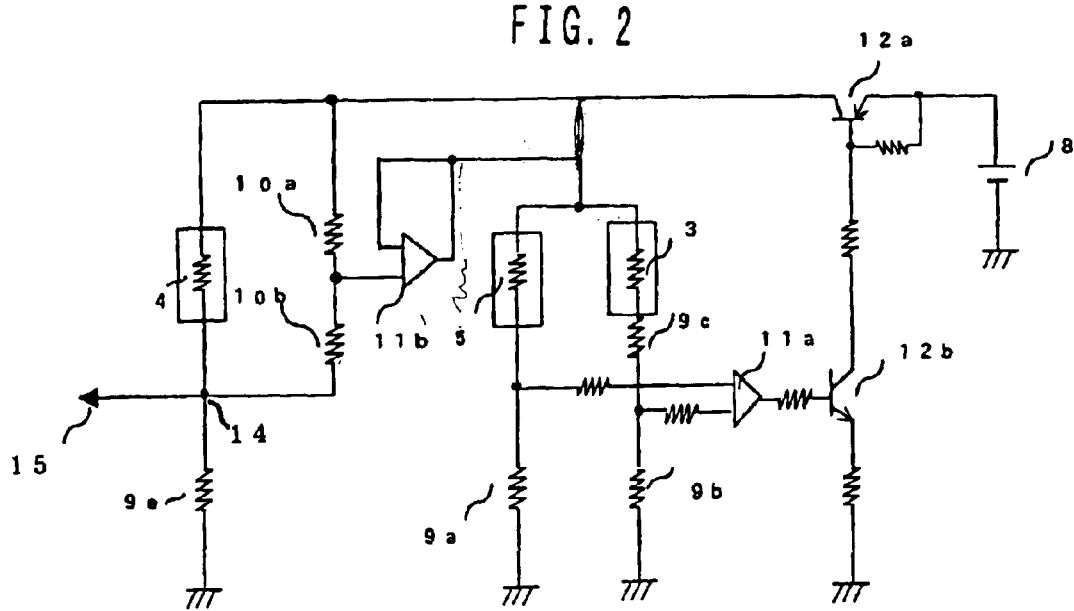
FIG. 2 is a circuit diagram showing the structure of the thermosensitive flow rate detecting device in according with the first embodiment of the present invention.

FIG. 2 is a circuit diaphragm showing a structure of the thermosensitive flow rate detecting circuit in accordance with the first embodiment. In FIG. 2, the circuit structure composed of the transistors 12a and 12b for feeding heating current to the heat generating resistor 4, the heat generating resistor 4 and the fixed resistor 9e is the same as the detecting circuit of the conventional flow rate detecting device. As a new reference numeral, character 11a denotes an operation amplifier for differentiating and amplifying the output of the bridge circuit. Also, symbols 10a and 10b denote partial resistors, symbol 11b denotes a differential amplifier for dividing the voltage of the heat generating resistor 4 by the partial resistors 10a and 10b and feeding the power source voltage to the above-described bridge circuit through the differential amplifier 11b. A potential of the fixed resistor 9e is a voltage in proportion to the heating current of the above-described heat generating resistor 4 and this voltage becomes a flow rate signal 15.

The operation of the thus constructed constant temperature difference circuit will now be described. For instance, in the case where the flow rate is increased, the second temperature detecting resistor 5 and the heat generating resistor 4 are cooled down. When the resistance of the second temperature detecting resistor 5 is somewhat lowered, the voltage of the non-inverting input terminal of the differential amplifier 11a is increased. Accordingly, the output voltage of the differential amplifier 11a is increased. The emitter current of the transistors 12a and 12b is increased and the heating current of the heat generating resistor 4 is also increased so that the temperature of the heat generating resistor 4 is elevated. The temperature change of the heat generating resistor 4 is transferred to the second temperature detecting resistor 5 through the thermal conduction and at the same time the bridge voltage is also increased through the differential amplifier 11b. The temperature (resistance) of the second temperature detecting resistor 5 is also increased to the original temperature (resistance) to thereby balance the bridge circuit.

Through the above-described circuit operation, the second temperature detecting resistor 5 is always kept at a temperature that is a constant temperature higher than that of the first temperature detecting resistor 3, and further, the heat generating resistor 4 is kept substantially at the same temperature as that of the above-described second temperature detecting resistor 5. At this time, since the electric power consumed by the heat generating resistor 4 is a function of the flow rate, the voltage 15 in proportion to the heating current or the heating current of the heat generating resistor 4 is detected to thereby realize the flow rate detection.

In the constant temperature difference circuit according to the first embodiment, a potential obtained by dividing the voltage of the heat generating resistor which increases with an increase in flow rate is supplied to the bridge circuit. Therefore, feed back gain is greater than that of the conventional temperature difference circuit. Accordingly, the dependency of the transistors 12 on the current amplification is low, and the higher the flow rate, the faster the response will become. It is thus possible to follow the engine pulsation without any time lag. Furthermore, the adverse affect of the voltage change of the power source 8 to the heating current may be suppressed.

Also, the larger the resistance ratio between the second temperature resistor 5 and the fixed resistor 9a and the resistance ratio between the partial resistor 10b and the partial resistor 10a, the larger the feedback gain will become. The response is faster and the self-heating temperature of the second temperature detecting resistor 5 is also elevated. These resistance ratios are set such that the increase in the self-heat generating temperature is about 0.1% in comparison with the temperature elevation of the heat generating resistor 4 and the responsiveness is not deteriorated at the maximum flow rate and maximum pulsation frequency.

As described above, in the thermosensitive flow rate detecting device in accordance with the first embodiment, the feedback gain of the constant temperature difference circuit is increased, and the frequency response is not dependent upon the current amplification rate of the transistors for feeding heating current. Furthermore, since the higher the flow rate, the higher the responsiveness becomes, it is possible to detect the flow rate with high detection also for the pulsating flow.

Embodiment 2

Figure 3:
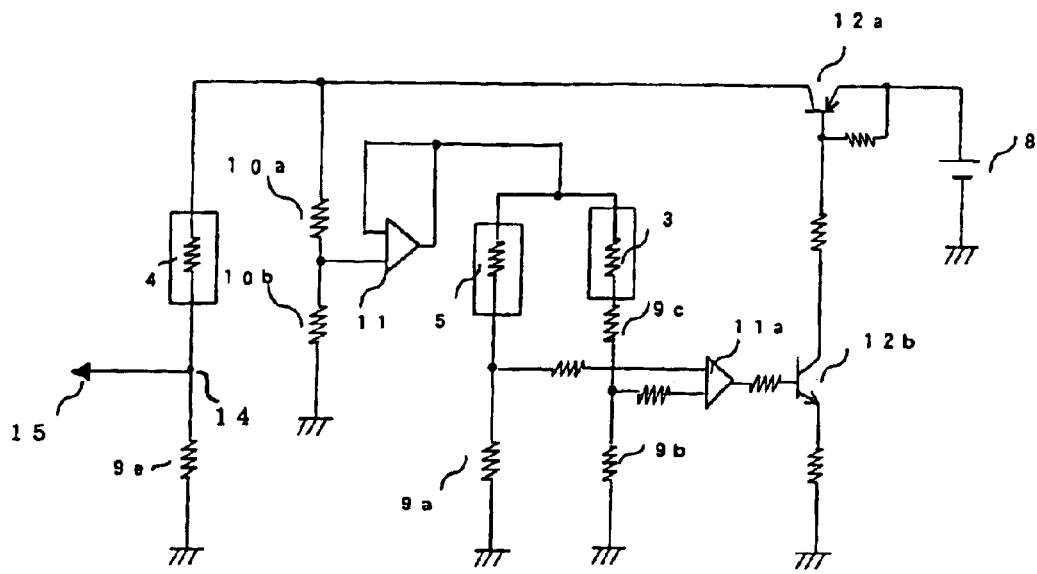
FIG. 3 is a circuit diagram showing a structure of a thermosensitive flow rate detecting device in according with a second embodiment of the present invention.
Figure 4:
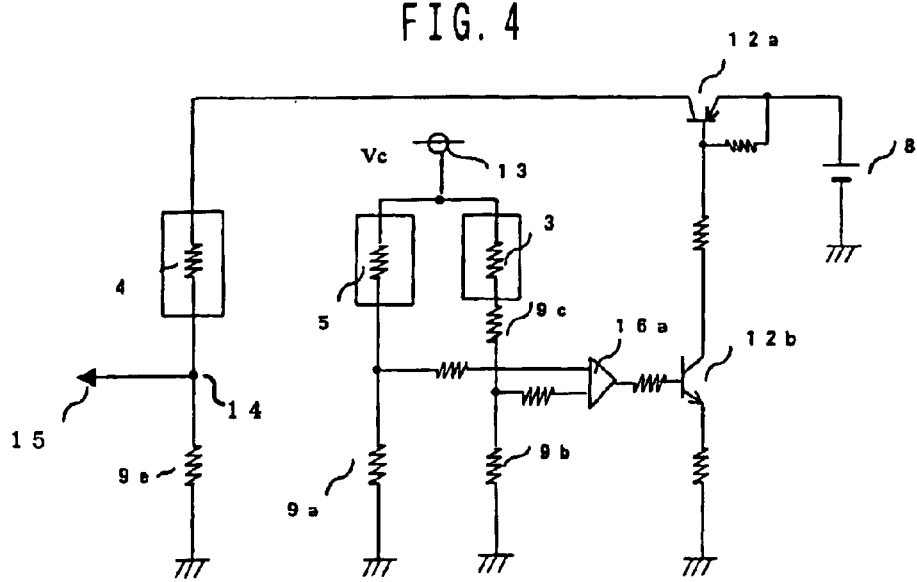
FIG. 4 is a circuit diagram showing a structure of a conventional flow rate detecting device.

FIG. 3 is a circuit diagram showing a structure of a thermosensitive flow rate detecting circuit in accordance with a second embodiment of this invention. In FIG. 3, the structure is the same as that of the above-described first embodiment except for the connecting method of the partial pressure resistor 10b. In the second embodiment, one of the terminals of the partial resistor 10b is grounded so that the current flowing through the resistors 10a and 10b will not flow to the fixed resistance 9e.

In the second embodiment also, since the power source voltage is applied to the bridge circuit in proportion to the heating current in the same way as in the first embodiment, it is possible to ensure the same effect.

As described above, according to the present invention, the feedback gain of the bridge circuit is increased so that, even if the flow rate change frequency is high, the second temperature detecting resistor operates with high followability and it is possible to suppress the detection flow rate error without any response lag for large flow, for example the pulsating flow of the engine in the high flow rate and high rpm region. Furthermore, according to this structure, since the frequency response property is not temperature-dependent, there is no response lag irrespective of the high temperature and low temperature. Also, it is possible to detect the flow rate with high precision even when the power source voltage is changed.

What is claimed is:

1. A thermosensitive flow rate detecting device comprising:
   a heat generating resistor, provided in fluid to be measured, for generating heat by electric power consumed in accordance with a flow rate of the fluid to be measured;
   a first temperature detecting resistor, provided in the fluid to be measured and positioned at a location that is substantially not in fluid communication with the heat generating resistor, for detecting a temperature of the fluid to be measured, wherein the fluid temperature changes in accordance with the flow rate;
   a second temperature detecting resistor, provided in fluid communication with the heat generating resistor, for detecting the temperature of said heat generating resistor, and
   a bridge circuit having said first temperature detecting resistor and said second temperature detecting resistor electrically connected together therein, the bridge circuit being adapted to control a heating current of said heat generating resistor to maintain a constant temperature difference between said first temperature detecting resistor and said second temperature detecting resistor, wherein the flow rate within the fluid to be measured is detected by using the heating current, and
   wherein said bridge circuit receives a voltage that is proportional to the heating current of said heat generating resistor.

2. A thermosensitive flow rate detecting circuit, comprising:
   a first temperature detecting resistor;
   a second temperature detecting resistor;
   a heat generating resistor that is provided in fluid communication with the second temperature detecting resistor;
   a bridge circuit having said first temperature detecting resistor and said second temperature detecting resistor electrically connected together therein; and
   a differential amplifier connected directly to the bridge circuit, the differential amplifier being adapted to divide a voltage across the heat generating resistor and output the divided voltage to the bridge circuit, wherein the second temperature detecting resistor is maintained at a constant temperature that is higher than a temperature of the first temperature detecting resistor and the heat generating resistor is maintained at substantially a same temperature as the second temperature detecting resistor.

3. A thermosensitive flow rate detecting circuit comprising:
   a first temperature detecting resistor;
   a second temperature detecting resistor;
   a heat generating resistor that is provided in fluid communication with the second temperature detecting resistor;
   a bridge circuit having said first temperature detecting resistor and said second temperature detecting resistor electrically connected together therein,
   a differential amplifier connected directly to the bridge circuit, the differential amplifier being adapted to divide a voltage across the heat generating resistor and output the divided voltage to the bridge circuit, wherein the second temperature detecting resistor is maintained at a constant temperature that is higher than a temperature of the first temperature detecting resistor and the heat generating resistor is maintained at substantially a same temperature as the second temperature detecting resistor;
   a first resistor having a first end connected to an input terminal of the differential amplifier and a second end connected to a first end of the heat generating resistor; and
   a second resistor having a first end connected to the input terminal of the differential amplifier and a second end connected to a second end of the heat generating resistor.

4. A thermosensitive flow rate detecting circuit comprising:
   a first temperature detecting resistor;
   a second temperature detecting resistor;
   a heat generating resistor that is provided in fluid communication with the second temperature detecting resistor;
   a bridge circuit having said first temperature detecting resistor and said second temperature detecting resistor electrically connected together therein;
   a differential amplifier connected directly to the bridge circuit, the differential amplifier being adapted to divide a voltage across the heat generating resistor and output the divided voltage to the bridge circuit, wherein the second temperature detecting resistor is maintained at a constant temperature that is higher than a temperature of the first temperature detecting resistor and the heat generating resistor is maintained at substantially a same temperature as the second temperature detecting resistor;
   a first resistor having a first end connected to an input terminal of the differential amplifier and a second end connected to a first end of the heat generating resistor; and
   a second resistor having a first end connected to the input terminal of the differential amplifier and a second end connected to ground potential.

* * * * *